United States Patent
Trotman et al.

(10) Patent No.: US 8,229,800 B2
(45) Date of Patent: Jul. 24, 2012

(54) SYSTEM AND METHOD FOR AN ENHANCED SHOPPING EXPERIENCE

(75) Inventors: Douglas Keith Trotman, San Antonio, TX (US); Jay Wilpon, Warren, NJ (US); Mazin Gilbert, Warren, NJ (US); Giuseppe Di Fabbrizio, Florham Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 141 days.

(21) Appl. No.: 12/343,147

(22) Filed: Dec. 23, 2008

(65) Prior Publication Data

US 2010/0070378 A1 Mar. 18, 2010

Related U.S. Application Data

(60) Provisional application No. 61/096,786, filed on Sep. 13, 2008.

(51) Int. Cl.
*G06Q 30/00* (2012.01)
(52) U.S. Cl. ...................... 705/27.2; 705/26.1
(58) Field of Classification Search .................. 705/26, 705/26.1–27.2
See application file for complete search history.

(56) References Cited

U.S. PATENT DOCUMENTS

| | | | |
|---|---|---|---|
| 6,317,718 B1* | 11/2001 | Fano | 705/14.39 |
| 6,381,583 B1* | 4/2002 | Kenney | 705/26 |
| 2001/0007979 A1* | 7/2001 | Teshima | 705/26 |
| 2001/0044754 A1* | 11/2001 | Fujii et al. | 705/26 |
| 2001/0051876 A1* | 12/2001 | Seigel et al. | 705/1 |
| 2004/0193441 A1* | 9/2004 | Altieri | 705/1 |

OTHER PUBLICATIONS

Three Top Marketers Sign on to Sponsor "The Flushed Away Underground Adventure," a Groundbreaking Online Gaming Experience From AOL, DreamWorks Animation and Mark Burnett Productions. Business Wire Sep. 28, 2006.*

* cited by examiner

*Primary Examiner* — Jeffrey A Smith
*Assistant Examiner* — Resha Desai (57) ABSTRACT

Disclosed herein are systems, methods, and computer readable-media for creating a virtual shopping area. The method includes receiving a query from a user and an automated input specific to the user from a computing device, generating a list of merchants based on the query and the automated input, generating a virtual shopping area from the list of merchants and based on one or more constraints, and displaying the virtual shopping area on the computing device. One optional step is presenting to the user an interface to purchase query-related items from merchants in the virtual shopping area. The method optionally includes receiving an indication of intent to purchase an item from the user, displaying an image of the item to the user, and dynamically updating the displayed image of the item as the user specifies item-specific details. The list of merchants can be restricted to merchants geographically close to the user.

20 Claims, 5 Drawing Sheets

SYSTEM AND METHOD FOR AN ENHANCED SHOPPING EXPERIENCE

PRIORITY CLAIM

The present application claims the benefit of U.S. Provisional Application No. 61/096,786, filed Sep. 13, 2008, the content of which is incorporated herein by reference in its entirety.

BACKGROUND OF THE INVENTION

1. Field of the Invention

The present invention relates to virtual commerce and more specifically to creating a virtual shopping area on a computing device.

2. Introduction

With the widespread popularity of the Internet and secure ways to conduct commerce online, consumers purchase goods and services online with increasing frequency. Online commerce differs from traditional brick-and-mortar commerce because consumers can browse to any web address with minimal difficulty. The geographic and spatial distance between businesses does not matter because each business's web presence is literally at the consumer's fingertips. However, consumers are easily overwhelmed by so many options and may not know all the relevant options or even which options are relevant.

Often a consumer does not have a specific merchant or a specific item in mind, but just a category, such as pizza parlor, florist, or toy store. Searching for a category of merchants and making a purchase with one is a cumbersome and mismatched process involving opening a search engine, formulating a query, browsing through the results one by one until a particular result is good enough. Each merchant has a different interface, separate user profiles, different product lines, etc. If the user is not already familiar with a particular merchant, the user is less likely to visit that merchant in an online environment. In a mall, for example, a merchant's store front, décor, music, employees, etc. are an invitation for consumers to enter, browse, and purchase. In other words, merchants can control the environment to some extent to make their store more appealing. Consumers wander through the mall, often for leisure, and browse stores that interest them. Many of the real life aspects of shopping are absent in online commerce. For example, a line of text in a list of search results does attract customers like a store window showing the latest fashions and advertising a sale or a pizza shop with a large picture of a slice of pizza and free samples.

Accordingly, what is needed in the art is an improved way for users to purchase goods and services from merchants on a computing device that captures some of the elements of in-person shopping.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for creating a virtual shopping area. The method includes receiving a query from a user and an automated input specific to the user from a computing device, generating a list of merchants based on the query and the automated input, generating a virtual shopping area from the list of merchants and based on one or more constraints, and displaying the virtual shopping area on the computing device. One optional step is presenting to the user an interface to purchase query-related items from merchants in the virtual shopping area. Another optional step is presenting to the user a map indicating a location of at least one merchant. The method optionally includes receiving an indication of intent to purchase an item from the user, displaying an image of the item to the user, and dynamically updating the displayed image of the item as the user specifies item-specific details. The list of merchants can be restricted to merchants geographically close to the user. The computing device can be a mobile device. The query can be a natural language query or a query is for a general type of product or service. The virtual shopping area can be a three-dimensional virtual space.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
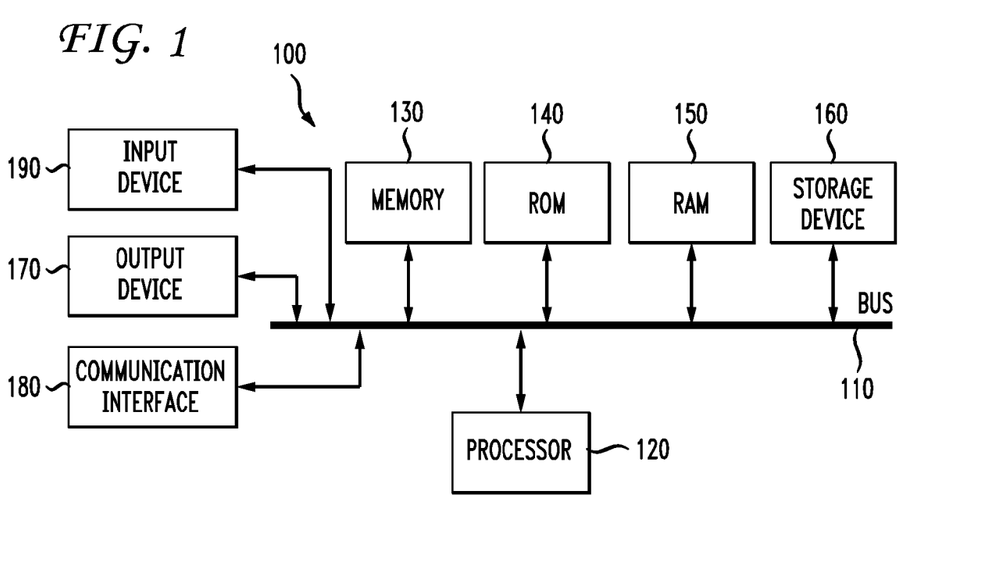
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software.

Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
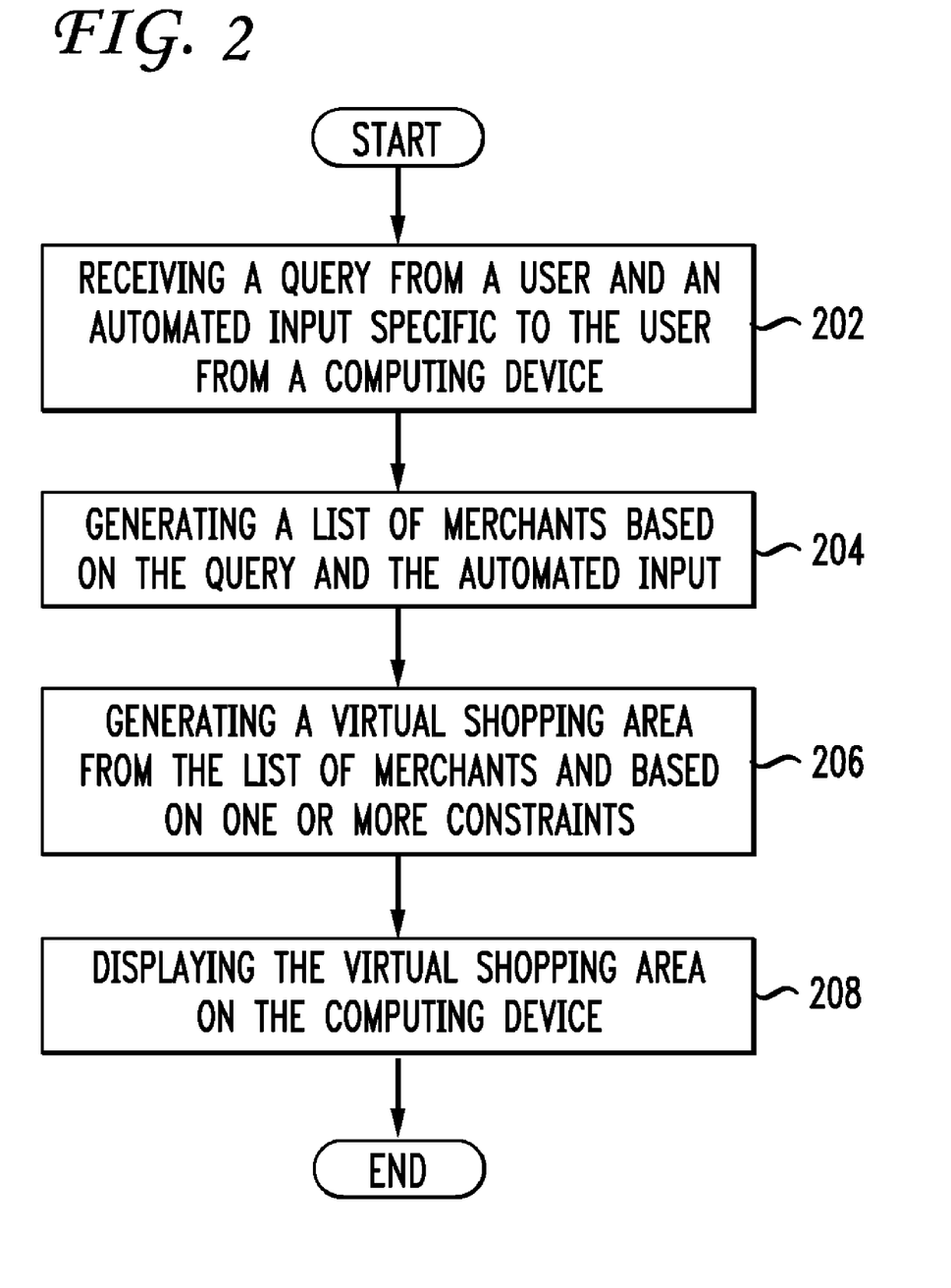
FIG. 2 illustrates an example method embodiment.

Having discussed basic system components, the disclosure turns to the method embodiment. The method is discussed in terms of a system configured to practice the method. FIG. 2 illustrates an example method embodiment. The system receives a query from a user and an automated input specific to the user from a computing device (202). The query can be a natural language query, entered text, a selection from a list, other suitable input, or any combination. For example, a hungry user can speak a natural language query into a microphone attached to or integrated with the computing device. Some such natural language queries are "Are there any Chinese take-out places nearby?" and "I'm hungry. Find me a restaurant like my favorite take-out place, Big Jimmy's Kum Kau". The user can enter a similar query in a keyboard or keypad, select "Chinese Food" from a pull-down menu, click a button labeled "Chinese Food", etc. The computing device can be a desktop computer as well as a smartphone such as a RIM Blackberry®, Apple iPhone®, or Palm Treo®, a PDA such as a Windows Mobile or a Palm handheld, or a mobile computer such as an Asus eeePC®, OQO Model 02®, etc. In one aspect, automated input includes a user account, a phone number of the mobile device, a user name, a password, all or part of a user profile, and/or GPS data. The system can use other types of automated input as well.

The system generates a list of merchants based on the query and the automated input (204). In one aspect, a user submits a query for a general type of product or service and the list of merchants includes only those merchants selling the general type of product or service. For example, if the user submits a query for hardware stores, the system includes stores like Ace®, Lowe's®, Home Depot®, and True Value® in the list of merchants. The system would not include stores like McDonald's®, Staples®, and Old Navy® which offer goods and services completely unrelated to hardware stores.

The system can also restrict the list of merchants to those merchants geographically close to the user. This aspect can be extremely important when many merchants are returned. For example, if a user searches for gas stations in the middle of a large metropolitan area, the system can return a list of hundreds or even thousands of merchants. Even when the system filters the list based on the query and the automated input, the list can still contain far too many merchants. The user or the system can establish a geographic threshold based on absolute distance, driving distance, driving time, the nearest ten merchants, etc. The system culls those merchants out of the list that do not fall within the geographic threshold.

In one aspect, merchants pay for placement in the list of merchants. For example, merchants can pay to "stretch" established geographic thresholds as applied to them. Merchants can pay to appear in all searches of a particular type in a particular area. Depending on the operative goals of the system, merchants can even pay for placement in lists based on queries not matching the merchant at all. For example, if a user is searching for a grocery store, a fast food merchant located near a grocery store can pay a fee to appear next to the grocery store in the list. This can serve a dual purpose of attracting customers not only to the fast food merchant, but also to the supermarket if nearby fast food is an incentive.

Figure 4:
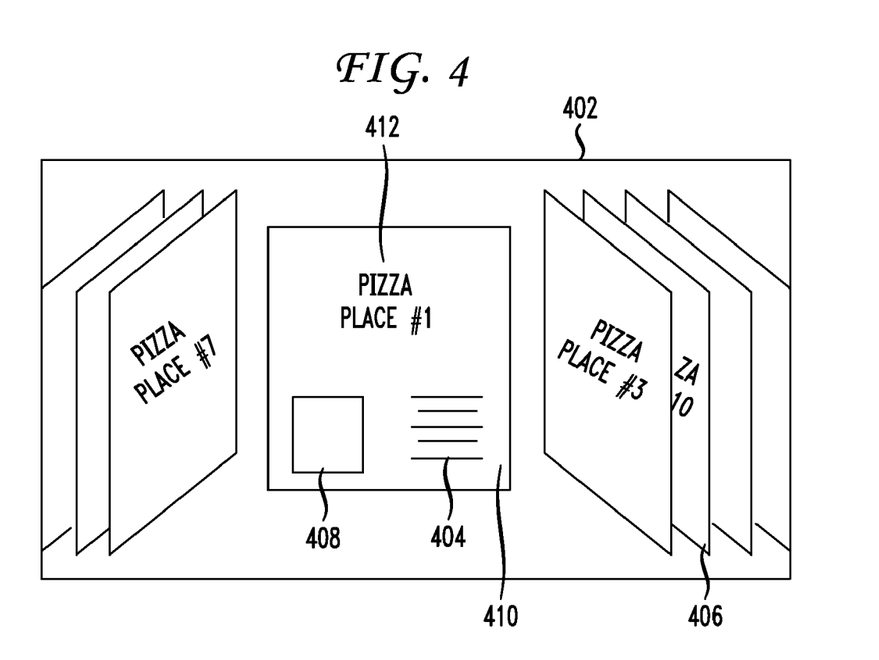
FIG. 4 illustrates a first example user interface for a virtual shopping area.
Figure 5:
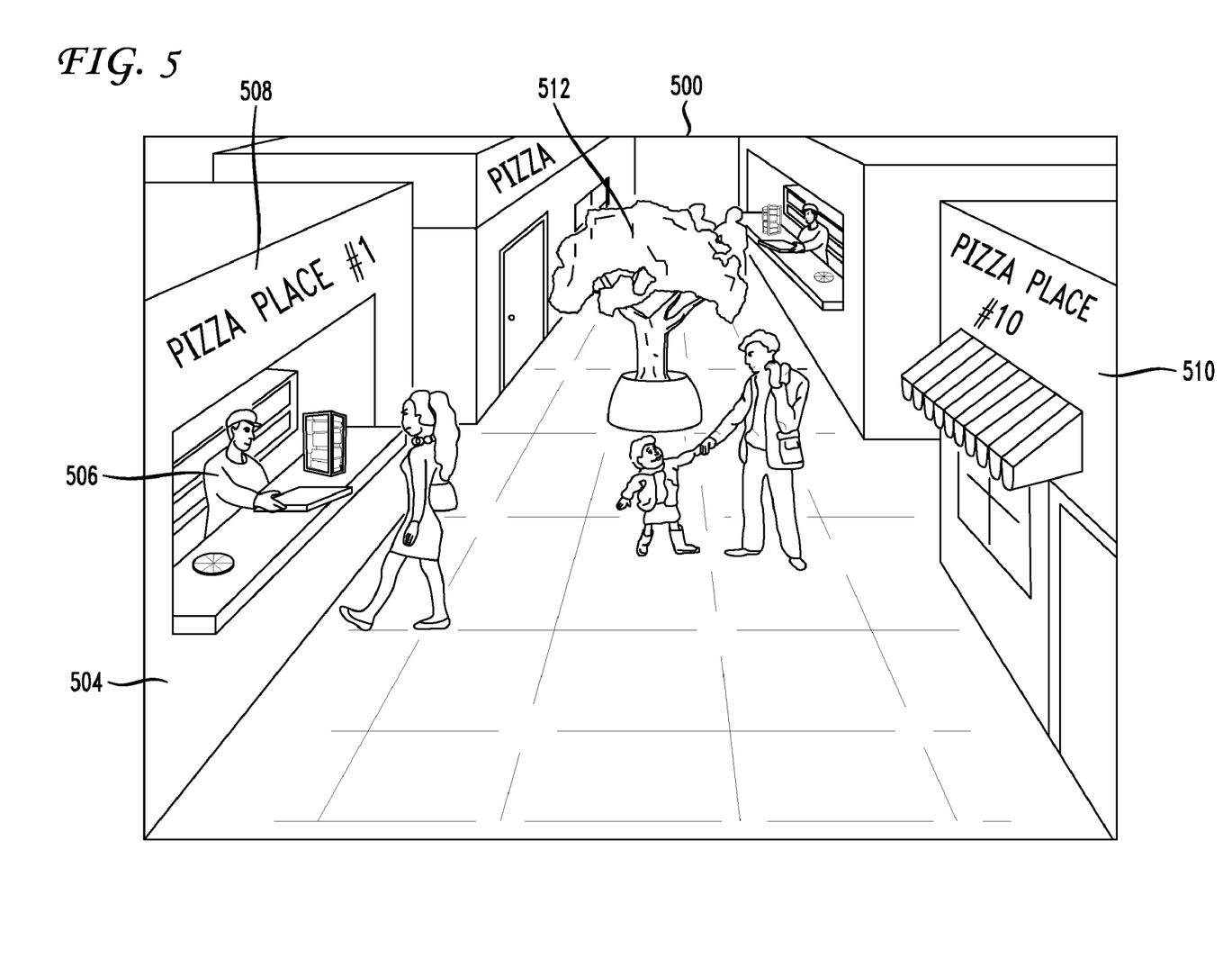
FIG. 5 illustrates a second example user interface for a virtual shopping area.

The system generates a virtual shopping area from the list of merchants and based on one or more constraints (206). The constraints can include items like a user profile, usage history, a price limit, a whitelist, a blacklist, etc. In one aspect, the virtual shopping area is a three-dimensional virtual space. The system can pattern the virtual space after an existing or imaginary space. The system can provide merchants with a dedicated section which the merchant can design in any manner. For example, the merchant can provide a logo, promotional text, colors, sounds, etc. for use in the virtual shopping area. Alternatively, the system can use a stock image representing each merchant. The system can pattern a three-dimensional model of the merchant after a representative actual real storefront. Two sample virtual shopping areas are depicted in FIGS. 4 and 5.

The system displays the virtual shopping area on the computing device (208). The virtual shopping area can be displayed in a static form, such as a pre-generated computer image with optional "hot" areas to click, touch, mouse over, etc. The virtual shopping area can be a static three-dimensional model, an animated three-dimensional model, or a three-dimensional model within which a user can move and interact, somewhat like a first-person video game. The same system can interface with various computing devices. In one aspect, the system tailors the display of the virtual shopping area to the needs and capabilities of the computing device. For example, the system can transmit a pre-generated image of the virtual shopping area to a limited-ability and limited-display PDA while transmitting an intricate, highly interactive, three-dimensional virtual shopping area to a high performance personal computer.

The system optionally presents to the user an interface to purchase query-related items from merchants in the virtual shopping area. The system will necessarily change the interface for each type of item and each merchant. For example, if the item can be delivered or picked up, such as pizza, the interface can include that as a question, "Is this order for pickup or for delivery?" and request the delivery address from the user, if necessary. The system can provide a unified framework for merchants to sell items so users encounter a similar interface and approach across all merchants' stores. The interface can be wholly integrated with the virtual shopping area, the interface can be separate, or the interface can be semi-integrated. One example of wholly integrated interface is a three-dimensional virtual shopping area where a user can approach each virtual store front and place an order with a virtual store clerk. An example of a separate interface is allowing a user to purchase an item by directly opening the merchant's website in a separate web browser.

The system optionally presents to the user a map indicating a location of at least one merchant. Especially in the case of services which cannot be delivered as easily as goods, but also in the case of goods which can be picked up, the system can present a map to the user including markers for the location of one or more merchant in the list. The map can also show the user's current location and directions to one or more merchant. The system can enhance merchants' locations by placing animations, logos, sounds, etc. in conjunction with a merchant's respective marker.

In one aspect, the system receives an indication of intent to purchase an item from the user, displays an image of the item to the user, and dynamically updates the displayed image of the item as the user specifies item-specific details. Ordering a pizza is one well-suited example to demonstrate this concept. Consider a user who starts a natural language query for "high-end pizza in downtown Baltimore" on a mobile phone. The system assembles a list of 3 suitable pizza places, generates a three-dimensional virtual shopping area with a building for each of the three, presents the virtual shopping area to the user on the mobile phone and allows the user to browse and select one of the three. When the user selects her preferred pizza place, the system displays a custom "blank" cheese pizza on the mobile phone. As the user specifies desired toppings through speech input, pressing buttons, or other means, the system populates the pizza with "layers" of toppings, adjusts the crust, etc. For example, as a user says "with pepperoni", the system adds a layer of pepperoni in the image of the "blank" cheese pizza. As the user says deep dish, the system modifies the crust layer to reflect a deep dish style crust. When the user is done, the image should closely represent the ordered pizza. In some cases, the system can allow the user to interact with the image of the item. The user can spin the pizza image around, for example, on a touch-sensitive display. The user can brush toppings to one side of the pizza with a finger swipe or a tap to create an order for a pizza that is half cheese and half black olives. Although pizza is discussed in this example, the principles of the invention can be modified for the specific details of other types of items.

Figure 3:
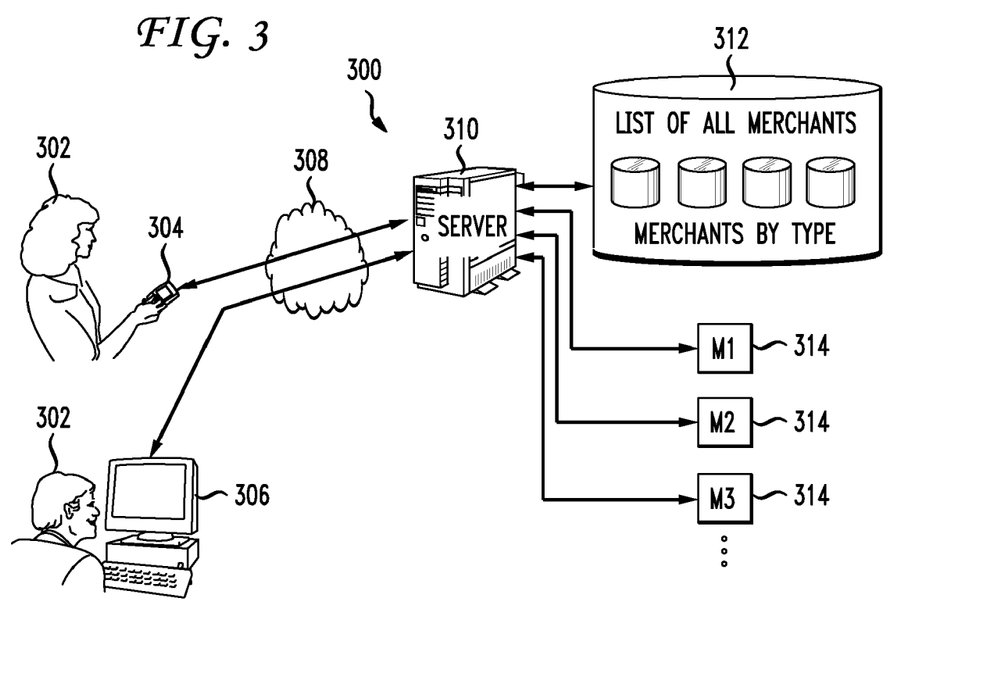
FIG. 3 illustrates an example system configuration.

FIG. 3 illustrates an example system configuration 300. A user 302 sends a query to a computing device such as a mobile phone 304 or a desktop computer 306. The computing device transmits the query to a server 310 over a network 308 such as the Internet, a local area network, a wireless network, or some combination. The computing device also sends automated, user-specific input to the server, such as a phone number, user profile, preferences, GPS information, etc.

The server 310 retrieves results from the list of all merchants 312 that match the query and the automated, user-specific input. The list of merchants can be organized into sub-categories, such as merchants by type, merchants by city, or other groupings. The server 310 then uses the matching merchants to create a virtual shopping area to display on the user's computing device 302. The user can then browse the virtual shopping area and select a merchant from whom to place an order. Once the user has decided on an item to purchase, the computing device 304, 306 transmits the order to the server 310 which relays that information to an order processing module 314 for the appropriate merchant. An order processing module 314 can relay order status to the server 310, which conveys that information to the user 302.

FIG. 4 illustrates a first example user interface for a virtual shopping area that is animated and three-dimensional. The screen 402 of the computing device is shown as a wide screen, but the principles can be adapted for virtually any screen size or screen shape. In this example, the screen is touch-sensitive, but the system can employ other manipulation schemes as well, such as a mouse with a scroll wheel, arrow keys, on-screen buttons, a stylus, etc. The computing device displays a square 404 representing a first merchant's presence in the virtual shopping area. Other squares 406 represent other merchants. A user can flip back and forth through the squares, much like an album or a phone book. A square can contain a corporate logo 408, informational text 410, and a merchant title 412. Merchants can incorporate other types of information as well, including animations, sounds, coupons, menus, price lists, contact information, etc. The user can click, tap, or speak to select one of the squares and navigate to a catalog or menu to order an item or service. The user can also indicate that a particular option should never be displayed in the list again by some action such as drawing an X over a square or dragging a square off the screen.

FIG. 5 illustrates a second example user interface for a virtual shopping area that is animated and three-dimensional. The screen 502 of the computing device shows a three-dimensional environment 502 approximating a generic food court in a mall. The user can navigate through the environment much like a 3D video game using off-screen buttons, gyroscope and accelerometer controls, speech commands, etc. The system constructs a kiosk or building 504 for each merchant. The system can determine the size, shape, décor, color, and other aspects of the building 504 based on input from the merchant. Merchants can even provide virtual models of salespeople 506 to assist customers, answer questions, give demonstrations, etc. The salespeople can be three-dimensional models of a real person or an imaginary person, a video recording, etc. The title 508 of the merchant is posted in large, easily visible letters. High visibility may be critical on the small screen of a portable device. Logos 510 can appear alongside merchant titles 508, as logos are often a clearly customer-recognizable indication of origin of the goods or services. To make the virtual shopping area more visually appealing, the system can incorporate decorations 512, sound effects (such as birds chirping or background music) and other embellishments. Merchants can purchase additional decorations or niceties, preferential positions, and other benefits from the system provider in order to better attract customers.

Figure 6:
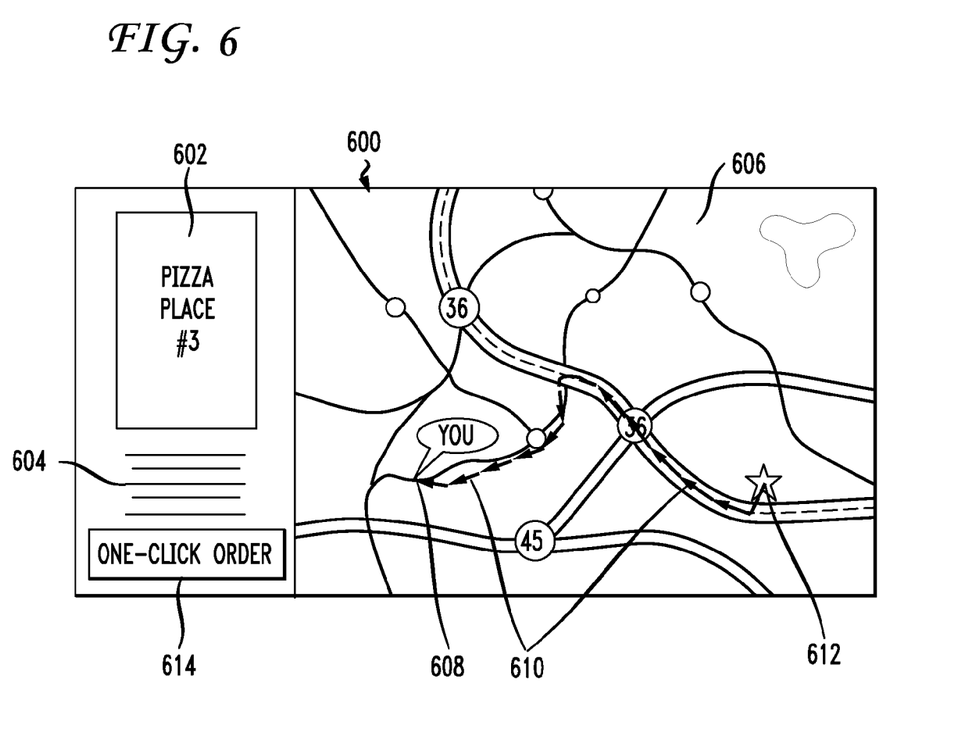
FIG. 6 illustrates an example user interface for a virtual shopping area map.

FIG. 6 illustrates an example user interface for a virtual shopping area map. When a user selects a particular merchant and orders an item which must be picked up, the system can display a map 606 to the user on the screen 600 of the computing device indicating the merchant's title and/or logo 602, merchant information 604 (including hours, amount due, etc.). The map can indicate the user's location 608 and an optimal travel path 610 to the merchant's physical location 612. To expedite orders, the system can provide one or more one-click buttons 614 allowing a user to place a user-defined "standard order", the most frequent order, the last order, etc. The system can adjust the text of the one-click button to reflect the type of order. For example, the text on the one-click button can be "Large Sausage and Pepperoni Pizza and 2 Diet Cokes", "The Usual", or "The same order as last Tuesday".

In one aspect, the virtual shopping area can supplement or replace a point of sale (POS) system for a merchant. For example, many smaller businesses do not have or cannot afford a sophisticated POS system. The virtual shopping area can fill basic or advanced elements of a POS system, handling credit card transactions, accounting, basic inventory management, etc. Merchants can purchase POS features as a paid service in whole or in part.

In one aspect, the system uses a roaming or universal user profile that transparently follows the user from merchant to merchant. Not only can the user profile maintain separate settings and preferences for each store, but the user profile can also extrapolate and predict general settings and preferences for one store based on behavior in another store. For example, if a user purchases size 34-30 pants in one store, then the next time the user visits a different pants merchant's virtual storefront, the virtual shopping area remembers that purchase from the first store and uses that information to suggest a default purchase size of 34-30 in the second store. The same principle can be applied to payment methods as well. A user associates a credit card with her user profile and the system uses that credit card to complete transactions seamlessly with any of the available merchants in the virtual storefront. The system can transfer any of these roaming preferences in a media agnostic way. For example, these settings can follow the user when ordering on a landline, a smart phone, a personal computer, on AT&T U-Verse television service, internet orders, in person interactions at a merchant's real-life place of business, etc.

In one aspect, the virtual shopping area polls or verifies inventories and/or product availability with the merchants before presenting an option to purchase to the user. For example, if a user wants to order a foot-long hoagie sandwich to go, the system can check the inventory of likely merchants to verify that each can provide the sandwich. The check can be an automatic query to an inventory or resource database or the check can be a semi-manual/semi-automatic process. For instance, if a user wants a foot-long hoagie sandwich, the system can tell the user to wait while it checks availability. While the user is waiting, the system calls each merchant with a message such as "Press 1 if you can have a foot-long hoagie sandwich ready in the next 20 minutes." After waiting a reasonable time, the system returns the positive results as options for the order.

In another aspect, the system provides recommendations for goods, services, or particular merchants based on the behavior of others with similar interests. The system can mark recommendations through some enhanced presentation in the virtual shopping area. For example, a highly recommended merchant or item can appear in a different font, color, shape, size, with a star or other object accompanying it, etc. To be as effective as possible, the recommendation mark should be consistent across each possible medium to serve a quasi-trademark purpose to identify the source of the recommendation. In one embodiment of this aspect, the virtual shopping area provides a Zagat®-like interface to a user for browsing popular recommendations based on other users' behavior who have similar profiles.

In yet another aspect, the system can provide a virtual shopping area through a set-top box to a television set. A user can speak a query into her remote control. The user can command the television set, navigate the virtual shopping area, and even complete a purchase through natural language speech interactions with the remote control.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to any kind of query for items provided by merchants. Those skilled in the art will readily recognize various modifications and changes that may be made to the present invention without following the example embodiments and applications illustrated and described herein, and without departing from the true spirit and scope of the present invention.

We claim:

1. A method comprising:
   receiving a query from a user;
   receiving an automated input specific to the user;
   generating a list of merchants based on the query and the automated input and prior to the user purchasing an item;
   generating a virtual shopping area from the list of merchants and based on at least one constraint; and
   displaying on a device the virtual shopping area comprising a three-dimensional representation of a building or kiosk of each merchant on the list of merchants, wherein the representation is based at least in part on at least one merchant-selected attribute of the representation which is selected from the group consisting of: size, shape, décor and color, and wherein the representation comprises automatically generated recommendation markings identifying at least one of a recommended product, a recommended service, a recommended merchant from the list of merchants, and a merchant from the list of merchants providing at least one of the recommended product and the recommended service.

2. The method of claim 1, further comprising presenting to the user an interface to purchase query-related items from merchants in the virtual shopping area.

3. The method of claim 1, further comprising presenting to the user a map indicating a location of at least one merchant.

4. The method of claim 1, further comprising:
   receiving from the user an indication of intent to purchase an item;
   displaying an image of the item to the user; and
   dynamically updating the image of the item as the user specifies item-specific details.

5. The method of claim 1, wherein the list of merchants is restricted to merchants geographically close to the user.

6. The method of claim 1, wherein the computing device is a mobile device.

7. The method of claim 1, wherein the query is a natural language query.

8. The method of claim 1, wherein the query is for a general product type and the list of merchants includes only those merchants having inventory matching the general product type.

9. The method of claim 1, wherein merchants pay for placement in the list of merchants.

10. The method of claim 1, wherein the automated input is one of a user account, a phone number associated with the computing device, a user name, a password, and position data.

11. The method of claim 1, wherein the automatically generated recommendation markings are based on behavior of other users with interests similar to interests of the user.

12. The method of claim 1, wherein the representation is adjusted based on capabilities of the device, and wherein the automatically generated recommendation markings are consistent irrespective of the capabilities of the device.

13. A system comprising:
   a processor;
   a first module configured to control the processor to receive a query from a user and to receive an automated input specific to the user;
   a second module configured to control the processor to generate a list of merchants based on the query and the automated input and prior to the user purchasing an item;
   a third module configured to control the processor to generate a virtual shopping area from the list of merchants and based on at least one constraint; and
   a fourth module configured to control the processor to display on a device the virtual shopping area comprising a three-dimensional representation of a building or kiosk of each merchant on the list of merchants, wherein the representation is based at least in part on at least one merchant-selected attribute of the representation which is selected from the group consisting of: size, shape, décor and color, and wherein the representation comprises automatically generated recommendation markings identifying at least one of a recommended product, a recommended service, a recommended merchant from the list of merchants, and a merchant from the list of merchants providing at least one of the recommended product and the recommended service.

14. The system of claim 13, further comprising a fifth module configured to control the processor to present to the user an interface to purchase query-related items from merchants in the virtual shopping area.

15. The system of claim 13, further comprising a fifth module configured to control the processor to present to the user a map indicating a location of at least one merchant.

16. The system of claim 13, further comprising:
a fifth module configured to control the processor to receive from the user an indication of intent to purchase an item;
a sixth module configured to control the processor to display an image of the item to the user; and
a seventh module configured to control the processor to dynamically update the image of the item as the user specifies item-specific details.

17. The system of claim 13, wherein the list of merchants is restricted to merchants geographically close to the user.

18. A non-transitory computer-readable storage medium storing a computer program having instructions for controlling a computing device to perform steps comprising:
receiving a query from a user;
receiving an automated input specific to the user;
generating a list of merchants based on the query and the automated input and prior to the user purchasing an item;
generating a virtual shopping area from the list of merchants and based on at least one constraint; and
displaying on a device the virtual shopping area comprising a three-dimensional representation of a building or kiosk of each merchant on the list of merchants, wherein the representation is based at least in part on at least one merchant-selected attribute of the representation which is selected from the group consisting of: size, shape, décor and color, and wherein the representation comprises automatically generated recommendation markings identifying at least one of a recommended product, a recommended service, a recommended merchant from the list of merchants, and a merchant from the list of merchants providing at least one of the recommended product and the recommended service.

19. The non-transitory computer-readable medium of claim 18, the instructions further comprising presenting to the user an interface to purchase query-related items from merchants in the virtual shopping area.

20. The non-transitory computer-readable medium of claim 18, wherein the list of merchants is restricted to merchants geographically close to the user.

* * * * *